(12) United States Patent
Hiraga et al.

(10) Patent No.: US 7,050,207 B1
(45) Date of Patent: May 23, 2006

(54) OPTICAL PICKUP DEVICE USING HOLOGRAM PATTERN AND HOLOGRAM PATTERN GENERATING METHOD

(75) Inventors: Takayoshi Hiraga, Yokosuka (JP); Hiroshi Miyazawa, Tokorozawa (JP); Tohru Sinzou, Hachiouji (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/582,230

(22) PCT Filed: Feb. 12, 1999

(86) PCT No.: PCT/JP99/00621

§ 371 (c)(1),
(2), (4) Date: Jul. 21, 2000

(87) PCT Pub. No.: WO99/42994

PCT Pub. Date: Aug. 26, 1999

(30) Foreign Application Priority Data

Feb. 19, 1998 (JP) ................................. 10-052657

(51) Int. Cl.
*G02B 5/32* (2006.01)
*G11B 7/00* (2006.01)

(52) U.S. Cl. .................... 359/15; 359/19; 369/103; 369/112.1; 369/112.15

(58) Field of Classification Search ............... 359/566, 359/19, 15, 569, 1, 218, 571, 112; 369/103, 369/112, 109, 102, 112.08, 44.23, 112.1, 369/112.15

See application file for complete search history.

(56) References Cited

U.S. PATENT DOCUMENTS

| 4,592,038 | A |   | 5/1986  | Kubota et al. |
| 4,720,825 | A |   | 1/1988  | Kokado |
| 4,787,075 | A |   | 11/1988 | Matsuoka et al. |
| 4,875,761 | A | * | 10/1989 | Fetzer .................. 359/218 |
| 4,929,256 | A | * | 5/1990  | Shepherd ................ 51/293 |
| 5,016,954 | A | * | 5/1991  | Onayama et al. ........ 359/15 |
| 5,422,753 | A | * | 6/1995  | Harris ................... 359/569 |
| 5,450,378 | A | * | 9/1995  | Hekker ................... 369/102 |
| 5,473,471 | A | * | 12/1995 | Yamagata et al. ........ 359/569 |

(Continued)

FOREIGN PATENT DOCUMENTS

JP          61-233445         10/1986

(Continued)

OTHER PUBLICATIONS

English Translation of Japanese Office Action (Notification of Reasons for Refusal) dated Apr. 9, 2002.

(Continued)

*Primary Examiner*—Audrey Chang
(74) *Attorney, Agent, or Firm*—Eric J. Robinson; Robinson Intellectual Property Law Office, P.C.

(57) ABSTRACT

Astigmatism and coma are suppressed in an optical pickup device such that light from a single real laser light source is diffracted and divided by a hologram module into a plurality of light spots which are focused upon a plurality of tracks of an optical disk to read data on the tracks at the same time. A non-diffraction end of fraction hologram patterns of the hologram module are determined so that light diffracted by the hologram module is given inverse aberration of that to be caused by optical elements in optical path from the real laser light source to the optical disk. Another hologram pattern provides a uniform intensity of a light spot formed of a laser light by an optical element.

4 Claims, 8 Drawing Sheets

U.S. PATENT DOCUMENTS 5,696,750 A * 12/1997 Katayama .............. 369/112.06
5,751,679 A * 5/1998 Yamakawa et al. .... 369/112.08
5,828,643 A * 10/1998 Takeda et al.
5,986,779 A * 11/1999 Tanaka et al. ................ 359/19

FOREIGN PATENT DOCUMENTS

| JP | 62-234118 | 10/1987 |
| JP | 04-132024 | 5/1992 |
| JP | 06-347689 | 12/1994 |
| JP | 6-347689 | 12/1994 |

OTHER PUBLICATIONS

Partial Translation of Korean Office Action (Notification of Reason for Refusal) dated Apr. 30, 2002.

* cited by examiner

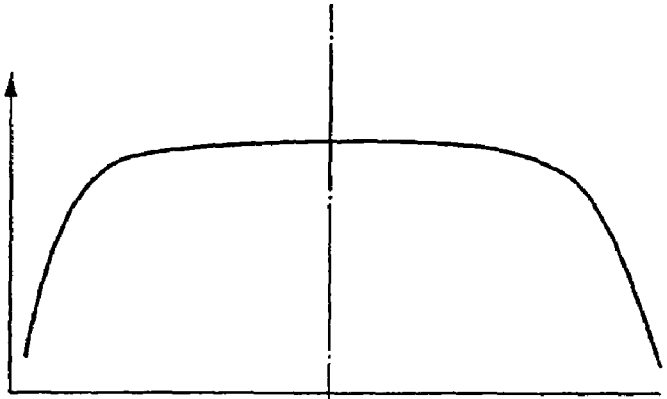
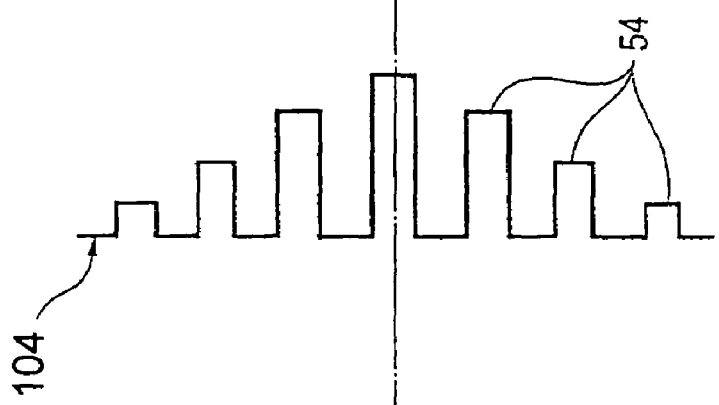

OPTICAL PICKUP DEVICE USING HOLOGRAM PATTERN AND HOLOGRAM PATTERN GENERATING METHOD

BACKGROUND OF THE INVENTION

1. Field of the Invention

The present invention relates to an optical pickup device for reading data from, and writing data into, a recording medium such as an optical disk and a card, and more particularly to a multi-beam optical pickup device capable of forming light spots on a plurality of tracks of a recording medium at the same time.

2. Description of the Related Art

In one of the methods of reading at the same time data recorded on a plurality of tracks of a recording medium such as an optical disk, light is emitted from an optical pickup device and focussed upon respective tracks of the recording medium, and light reflected from the tracks is detected with respective photodetectors. Methods of forming a plurality of light spots as illustrated in FIGS. 7 and 8 are known. Basics of these methods will be described with reference to FIGS. 7 and 8 in which elements similar to those of the embodiments to be described later are represented by using identical reference numerals. With the method illustrated in FIG. 7, a semiconductor laser array 60 having semiconductor lasers same in number as the number of necessary light spots is used to emit light from light sources 61a, 61b, 61c, and 61d of the semiconductor lasers. With the method illustrated in FIG. 8, a single semiconductor laser 10 is used. Light emitted from a real laser light source 11 ("real" is used to distinguish from "imaginary" laser light sources 12a, 12b, and 12c to be later described) of the semiconductor laser 10 is divided by a diffraction grating 64 into a plurality of light fluxes which serve as those emitted from the light sources 61a, 61b, 61c, and 61d of the semiconductor laser array 60 shown in FIG. 7.

The method illustrated in FIG. 7 using the semiconductor array 60 is, however, associated with the following problems: (a) since a plurality of semiconductor lasers are assembled in one package or chip, there is a limit of reducing the size of the semiconductor laser array; (b) the number of connection terminals increases; (c) it is difficult to make the array compact because a surface area thereof is required to be as large as it allows heat dissipation; and (d) manufacture yield and cost are bad because it is necessary to use a plurality of semiconductor lasers having uniform characteristics.

Although only a single semiconductor laser can be used with the diffraction grating 64 and manufacture cost can be lowered, it is necessary to mount the diffraction grating 64 at the position as near to the semiconductor laser as possible in order to make compact the optical pickup device. In this case, as shown in FIG. 9; the nearer to the semiconductor laser the diffraction grating is mounted, the larger the angle θ between the light beam incident upon the diffraction grating 64 from the real laser light source 11 and the diffraction light beam emitted from the diffraction grating 64 (θ1>θ2). Therefore, astigmatism and coma of a light spot become large, which make the diameters of light spots 25a, 25b, and 25c larger and increase jitters in a reproduced signal.

SUMMARY OF THE INVENTION

It is an object of the present invention to solve the above-described problems associated with a conventional optical pickup device of the type that a plurality of light spots are formed by utilizing diffraction of light emitted from a single real laser light source.

An optical pickup device of this invention comprises: (a) a single real laser light source; (b) a hologram member for diffracting light emitted from the real laser light source to form at least one imaginary laser light source; and (c) a light spot forming optical element for receiving light from the hologram member and forming a plurality of light spots on tracks of a recording medium. In the optical pickup device, hologram patterns of the hologram member are determined so that diffraction light is given an inverse aberration of an aberration to be caused by optical elements in an optical path from the real laser light source to the recording medium.

The light spot forming optical element includes not only an optical element such as a lens having different thicknesses at the central and peripheral areas but also an optical element such as a Fresnel body of a plate type having a uniform thickness. The recording medium includes an optical disk as well as a card capable of data read/write. The aberration includes astigmatism and coma.

Tracks of a recording medium on which a plurality of light spots are formed may be discrete tracks or one continuous track. Namely, the track of the recording medium may be constituted of a plurality of concentrical tracks or it may be a spiral one track.

The aberration caused by the optical elements in an optical path from the real laser light source to the recording medium may be the aberration caused by all or some of the optical elements. The hologram pattern of the hologram member is determined so that diffraction light is given an inverse aberration of an aberration to be caused by optical elements in an optical path from the real laser light source to the recording medium. The hologram pattern is not always required to completely cancel out the aberration to be caused by the optical elements, but there is a case where the light spot suitable for data read has some aberration. In this case, the hologram pattern is designed so that a predetermined amount of intrinsic aberration is positively left without completely cancelling out, or a predetermined amount of aberration having an inverse sign of the intrinsic aberration is intentionally formed. Obviously, the effect of reducing an aberration of a light spot on a recording medium is greater for the hologram pattern of the hologram member which gives the diffraction light the inverse aberration to be caused by all the optical elements in the optical path from the real laser light source to the recording medium, than the hologram pattern which gives the inverse aberration to be caused by some of the optical elements.

The hologram pattern may be an amplitude hologram pattern with bright and dark interference fringes or a phase hologram pattern with binary (stepped cross section) or blazed (sawtooth cross section) grooves. The hologram member generates at least one imaginary laser light source. All of a plurality of imaginary laser light sources may be generated on one side or both sides of the real laser light source. Although the light spot formed on a track of a recording medium is generally used for reading data on a track by detecting reflected light, it may be used for writing data.

The aberration to be caused by the optical elements in an optical path from the real laser light source to the recording medium is partially or completely cancelled out by the hologram pattern of the hologram member (although complete cancellation is preferable, partial cancellation is also applicable in practice). It is therefore possible to form a light spot on a track of a recording medium, which light source has reduced aberration or no aberration.

A column direction of hologram patterns of the hologram member of the optical pickup device of this invention is preferably aligned with the longer axis direction of the far field pattern of the real laser light source. The far field pattern is elliptic and indicates a cross sectional intensity distribution of light fluxes at a position spaced apart by about 10 to 20 cm from a semiconductor laser emission point. A light spread angle is larger in the longer axis direction than in the shorter axis direction so that a light output having a more uniform intensity can be obtained in the longer axis direction than in the shorter axis direction. With the column direction of the hologram patterns aligned with the longer axis direction of the far field pattern, light can be applied at a similar intensity both to the hologram pattern at the distal end of the hologram member and to the other hologram patterns. It is therefore possible to form imaginary laser light sources having a similar intensity to that of the real laser light source, and to lower a difference between intensities of light applied to the hologram patterns. Since a plurality of light spots having a small intensity difference can be applied to an optical disk, it is possible to suppress a variation in data signals read from the optical disk and photoelectrically converted. The quality of a data signal can therefore be prevented from being degraded. Since the hologram member is disposed, in a state capable of receiving light of a uniform intensity, at a position relatively remote from the real laser light source, the angle θ described with reference to FIG. 9 can be made small so that astigmatism and coma of a light spot can be reduced.

The hologram member of the optical pickup device of this invention may be a phase hologram member. The hologram pattern for diffraction light corresponding to each imaginary laser light source is determined so that an amount of diffraction light not forming a light spot is reduced and the reduced light amount is used as light spot forming diffraction light.

The diffraction light not forming a light spot has a concept opposite to the light spot forming diffraction light. Of the diffraction light, the light propagating toward the light spot forming optical element becomes the light spot forming diffraction light, whereas of the light propagating outside of the light spot forming optical element becomes the diffraction light not forming a light spot. The phase hologram member can reduce the amount of light propagating in a specific direction and direct the reduced amount of light in a different direction. Therefore, a light spot having a high light intensity can be formed by reducing an amount of diffraction light not forming a light spot and using the reduced light amount as the light spot forming diffraction light.

In the optical pickup device of this invention, a light spot on a recording medium formed by non-diffraction light from the real laser light source is used for servo operations. The hologram member has a hologram pattern which provides a uniform light intensity of the serve light spot in a whole light spot area.

The servo operations are typically a tracking servo and include other operations such as a focus servo. A light spot on a recording medium formed by non-diffraction light from the real laser light source is used not only for dedicated servo operations but also for a combination with data read and the like, the latter being commonly used.

The serve light spot is required to have a small light intensity change even when it has a tracking shift or the like. However, a light spot on a recording medium has generally a light intensity high at the central spot area and low at the peripheral spot area. Such a light spot is not effective for the servo light spot. Light from the real laser light source corresponding to the servo light source passes through the hologram member without diffraction. If this light is passed through a hologram pattern which reduces the light intensity at the central spot area and provides a uniform light intensity of the light spot on a recording medium in a whole spot area, then a light spot suitable for servo operations can be formed.

An optical pickup device of this invention comprises: (a) a single real laser light source; and (b) a light spot forming optical element for receiving light from the real laser light source via a hologram member and forming a servo light spot on a recording medium. The hologram member has a hologram pattern which provides a uniform intensity of the servo light spot in a whole servo light spot area.

BRIEF DESCRIPTION OF THE DRAWINGS

FIGS. 6A to 6C are graphs and a diagram illustrating a method of improving tracking servo light spots.

DETAILED DESCRIPTION OF THE PREFERRED EMBODIMENTS

Embodiments of the invention will be described with reference to the accompanying drawings.

Figure 1:
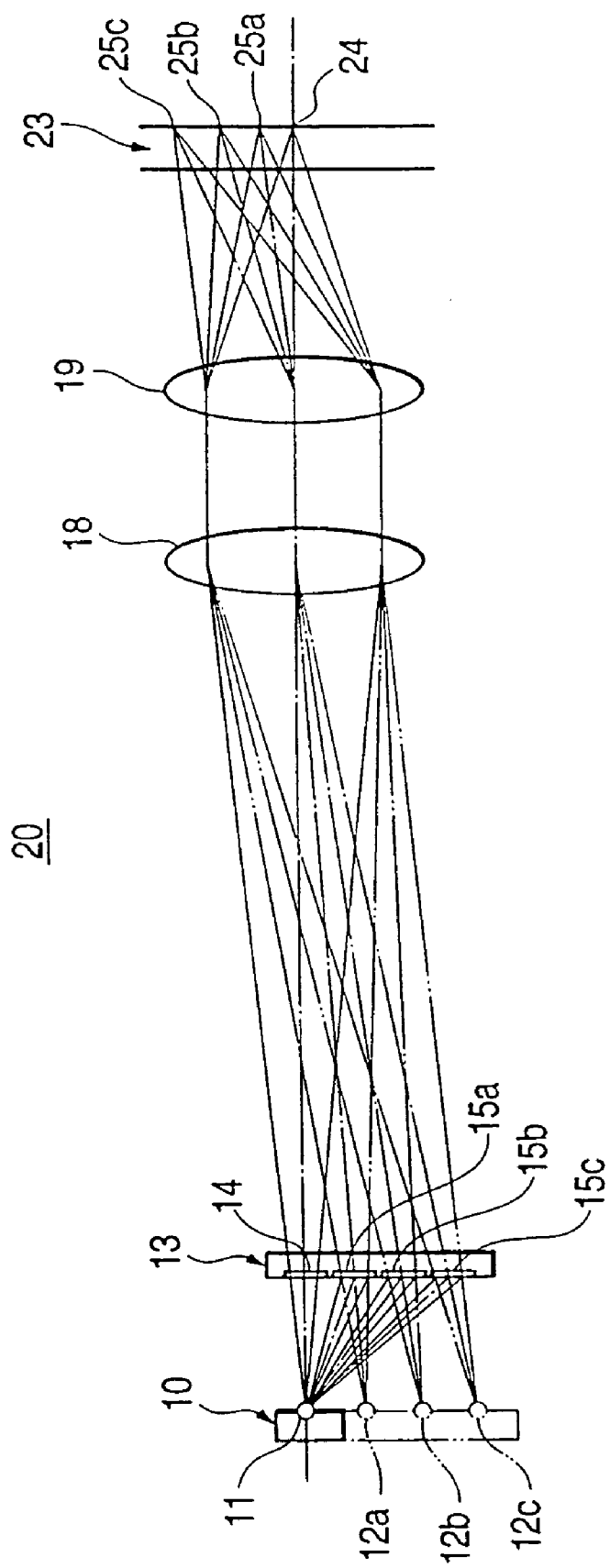
FIG. 1 is a diagram showing the configuration of an optical pickup device.
Figure 2:
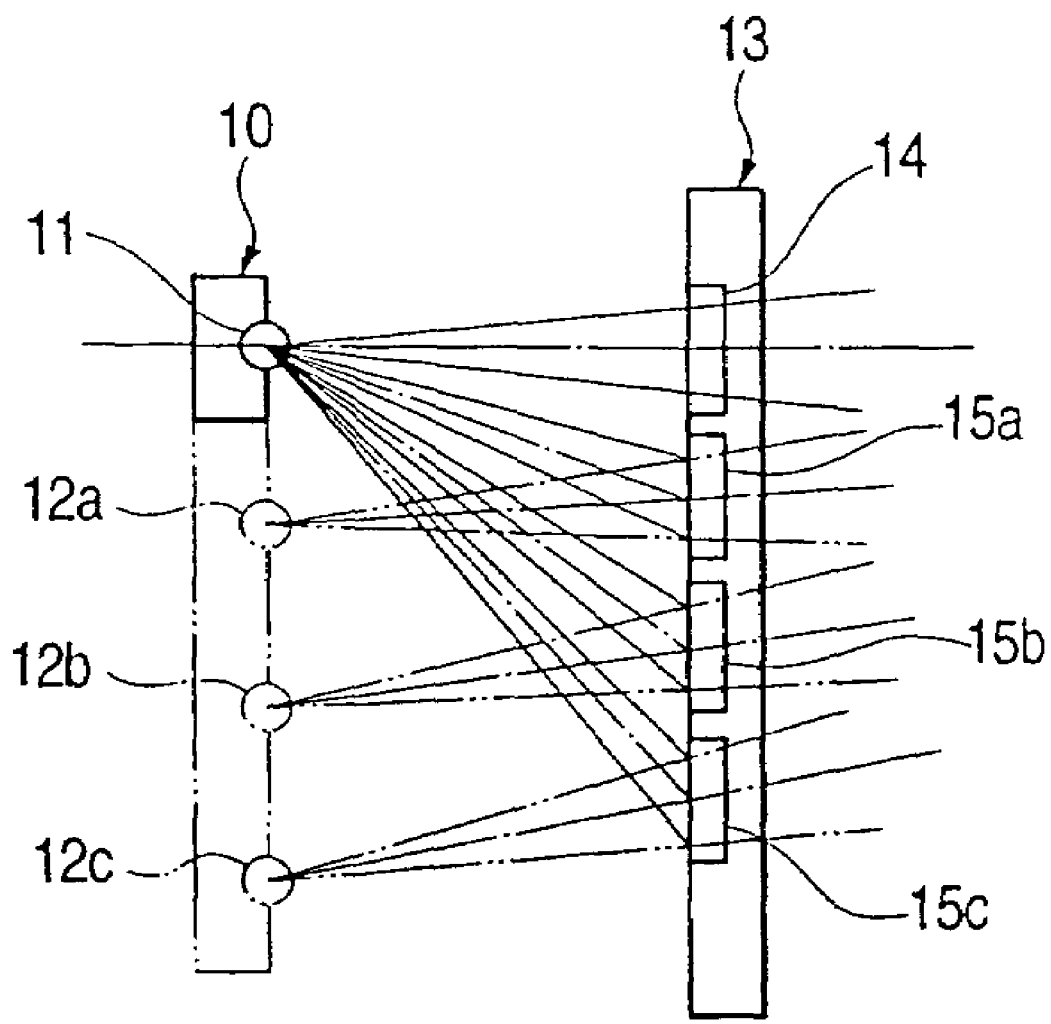
FIG. 2 is an enlarged view showing a portion of the optical pickup device shown in FIG. 1 from a semiconductor laser to a hologram module.

FIG. 1 is a diagram showing the configuration of an optical pickup device 20, and FIG. 2 is an enlarged view of a portion of the optical pickup device 20 shown in FIG. 1 from a semiconductor laser 10 to a hologram module 13. The optical pickup device 20 has an optical path in a range from the semiconductor laser 10 to an objective lens 19. The semiconductor laser 10 has a single laser chip. Light from a single real laser light source 11 ("real" is used to distinguish from "imaginary" laser light sources 12a, 12b, and 12c) of the semiconductor laser 10 is radiated toward a hologram module 13. The hologram module 13 has one non-diffraction hologram pattern 14 and three diffraction hologram patterns 15a, 15b, and 15c. Light from the real laser light source 11 transmits through the non-diffraction hologram pattern 14 without diffraction, and light from the real laser light source 11 is diffracted by the diffraction hologram patterns 15a, 15b, and 15c and advances toward a collimator lens 18. A diffraction light flux from each diffraction hologram pattern 15a, 15b, 15c is coincident with a light flux radiated from a corresponding one of the imaginary laser light sources 12a, 12b, and 12c. A column direction of the real and imaginary laser light sources 11, 12a, 12b, and 12c is parallel to a column direction of the non-diffraction and diffraction hologram patterns 14, 15a, 15b, and 15c. The real and imaginary laser light sources 11, 12a, 12b are disposed at an equal interval. In FIG. 1, although the non-diffraction and diffraction hologram patterns 14, 15a, 15b, and 15c are disposed on the hologram module 13 on the side of the semiconductor laser 10, they may be disposed on the hologram module on the opposite side of the semiconductor laser 10. Also in FIG. 1, although the non-diffraction and diffraction hologram patterns 14, 15a, 15b, and 15c are disposed separately in the column direction, they may be disposed partially overlapped in the column direction. Light emitted from the hologram module 13 passes through the collimator lens 18 to be transformed into parallel light fluxes which advance toward the objective lens 19. Light output from the objective lens 19 forms light spots 24, 25a, 25b, and 25c on respective tracks of an optical disk 23, as images of the real and imaginary laser light sources 11, 12a, 12b, and 12c. The tracks formed with the light spots 24, 25a, 25b, and 25c are sequentially positioned in a radial direction of the optical disk 23. Each reflected light spot of the light spots 24, 25a, 25b, and 25c propagates through the objective lens 19 and collimator lens 18 in a direction opposite to the incoming light and reaches via a beam splitter (not shown) to a photodetector (not shown) to thereby read data on each track.

The real laser light source 11 is disposed so that the longer axis direction of its far field pattern becomes coincident with the column direction of the non-diffraction and diffraction hologram patterns 14, 15a, 15b, and 15c of the hologram module 13. The far field pattern of the real laser light source 11 is elliptic. The light intensity of the far field pattern maintains a predetermined value or higher in a longer span along the longer axis direction of the ellipsoid. Therefore, with the longer axis direction set as described above, the light intensity of the imaginary laser light sources 12a, 12b, and 12c can be made uniform along the longer axis direction. The nondiffraction and diffraction hologram patterns 14, 15a, 15b, and 15c may be an amplitude hologram pattern with bright and dark interference fringes or a phase hologram pattern with binary or blazed grooves formed on glass or the like.

Light from the real laser light source 11 receives astigmatism and coma because of diffraction at the hologram module 13 and deflection at the collimator lens 18 and objective lens 19 so that the qualities of the optical spots 25a, 25b, and 25c on the optical disk 23 are lowered. To avoid this, the diffraction hologram patterns 15a, 15b, and 15c are made so that outgoing light fluxes from these patterns are given inverse aberration of the total astigmatism and coma in the optical path from the real laser light source 11 to the light spots 25a, 25b, and 25c. This inverse aberration is superposed upon the intrinsic total astigmatism and coma to thereby reduce or make zero the aberration of the optical spots 25a, 25b, and 25c (although zero aberration is most preferable, reduction only may be applied practically). The inverse aberration may be an aberration of astigmatism and comma caused by diffraction only, which is the significant factor of aberration, instead of the inverse aberration of the total astigmatism and coma in the optical path from the real laser light source 11 to the light spots 25a, 25b, and 25c. In this case, the astigmatism and coma of the optical spots 25a, 25b, and 25c are cancelled out partially with respect to the aberration caused by diffraction only.

Figure 3:
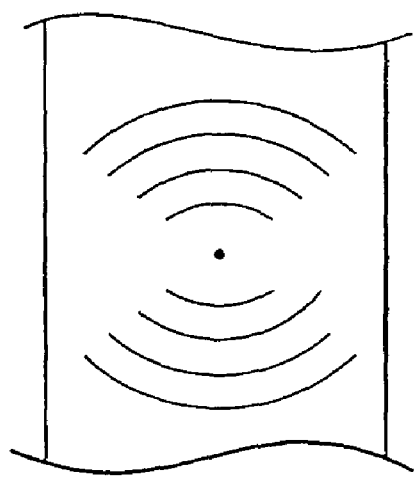
FIG. 3 is a schematic diagram showing a diffraction hologram pattern.
Figure 8:
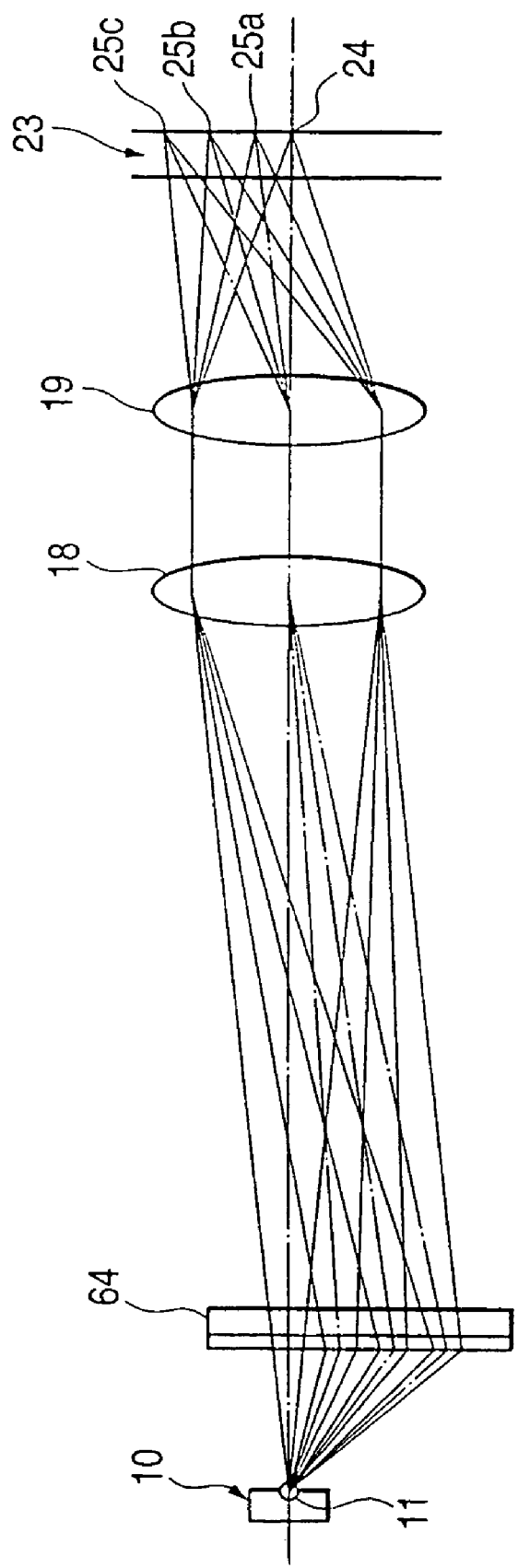
FIG. 8 is a diagram showing the configuration of a conventional optical pickup device which forms a plurality of light spots by using a single semiconductor laser.
Figure 9:
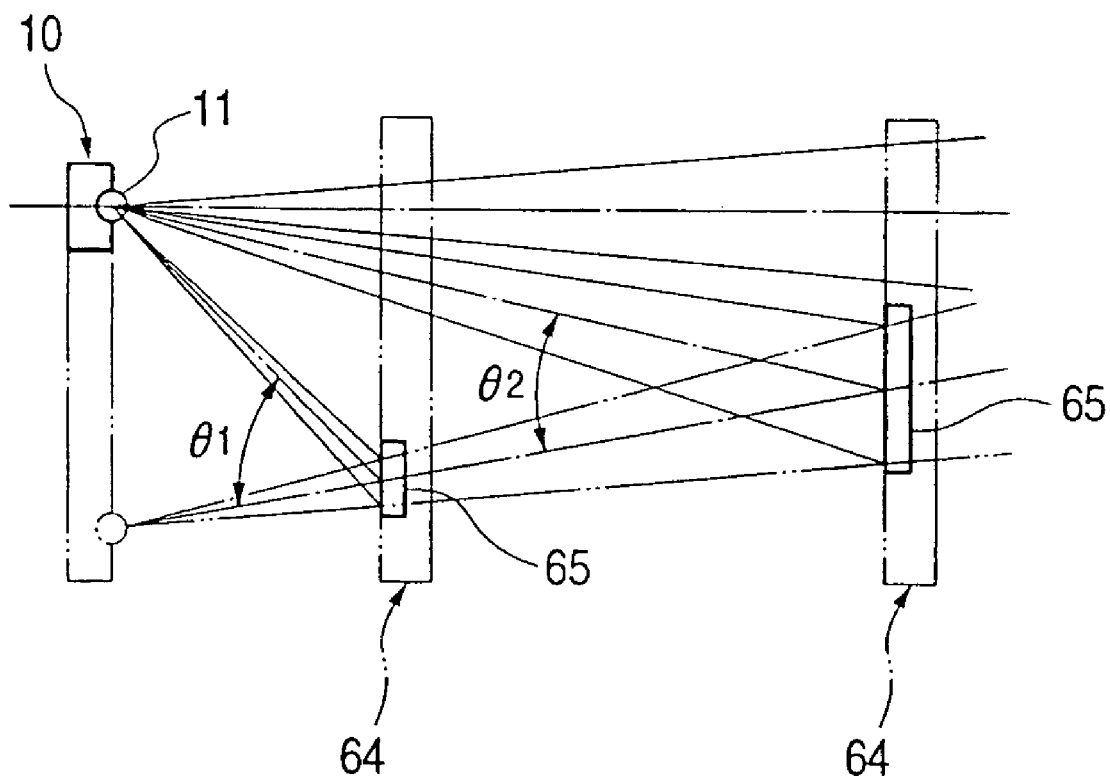
FIG. 9 is diagram showing an angle θ between the light beam incident upon a diffraction grating from a real light source and the diffraction light beam emitted from the diffraction grating disposed at a position spaced by some distance from a semiconductor laser of the optical pickup device shown in FIG. 8.

FIG. 3 is a schematic diagram of each of the diffraction hologram patterns 15a, 15b, and 15c. A diffraction grating pattern 65 of the diffraction grating 64 of the conventional optical pickup device shown in FIG. 8 is a pattern constituted of a plurality of parallel straight lines, because diffraction only is considered for cancellation of total aberration. In contrast, each of the diffraction hologram patterns 15a, 15b, and 15c providing both the diffraction function and aberration cancellation function is a pattern constituted of curved lines in place of parallel straight lines.

Methods of determining a hologram pattern will be described, which pattern gives, the diffraction light output from each of the diffraction hologram patterns 15a, 15b, and 15c, the inverse aberration of the total aberration in the optical path from the real laser light source 11 to each of the light spots 25a, 25b, and 25c, in order to remove the astigmatism and coma of each of the light spots 25a, 25b, and 25c. With a first method, a hologram pattern is determined by placing a photosensitive film on the hologram module 13 and recording interference fringes thereon by applying light from the real laser light source 11 and light sources placed at positions of the imaginary laser light sources, the light sources having the same wavelength as that of the real laser light source 11. The hologram pattern determined by this method does not theoretically form aberration (astigmatism and coma) of diffraction. A second method uses computer analysis software. Such computer analysis software is already sold and known. For example, software "code V" of Optical Research Associates in USA provides a formula (coefficients of a polynomial) which calculates a hologram pattern for two light sources (in the above example, the real laser light source 11 and one of the imaginary light sources 12a, 12b, and 12c). A hologram pattern not theoretically forming aberration (astigmatism and coma) of diffraction is determined in accordance with the obtained polynomial. If aberration of the collimator lens 18 and objective lens 19 is to be taken into consideration by using this software, data of the collimator lens 18 and objective lens 19, such as radius of curvature, lens thickness, and aspherical coefficient, is entered to simulate the optical configuration of the optical pickup device. With this simulation, a formula is obtained which is representative of a hologram pattern to be formed on the hologram module 13 by light fluxes from the real laser light source 11 and light sources having no aberration and placed at positions of the light spots 25a, 25b, and 25c on the optical disk 23. A hologram pattern determined from this formula can remove both aberration of the collimator lens 18 and objective lens 19 and aberration of diffraction.

Figure 4:
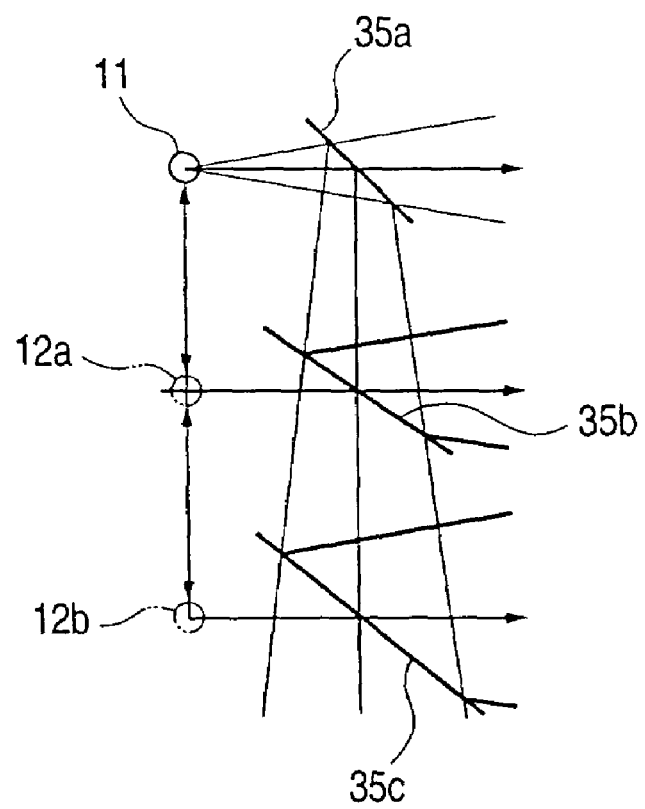
FIG. 4 is a diagram illustrating a method of determining each diffraction hologram pattern using optical elements.

FIG. 4 is a schematic diagram illustrating a method of determining each of the diffraction hologram patterns 15a, 15b, and 15c by using optical elements. A half-mirror 35a is placed at an intermediate position of an optical path from the real laser light source 11 to the non-diffraction hologram pattern 14, to partially reflect light downward. Half-mirrors 35b, 35c, . . . are also placed at intermediate positions of an optical path of the reflected light, to partially reflect light toward the diffraction hologram patterns 15a, 15b, . . . and transmit the residual light downward. The lowermost one (not shown) of the half-mirrors 35a, 35b, 35c, . . . is replaced by a full mirror to reflect light without transmit it downward. In this manner, a plurality of imaginary laser light sources 12a, 12b, and 12c having the characteristics coincident with the real laser light source 11 can be formed. Interference fringes to be formed at the position of the diffraction hologram pattern 15a by light fluxes from the real laser light source 11 and imaginary laser light source 12a are used as the diffraction hologram pattern 15a. For example, in order to record the diffraction hologram pattern 15a, photosensitive material is coated on the hologram module 13 and exposed with the interference fringe pattern. The diffraction hologram pattern thus obtained can cancel out and make zero the astigmatism and coma of diffraction.

Figure 5:
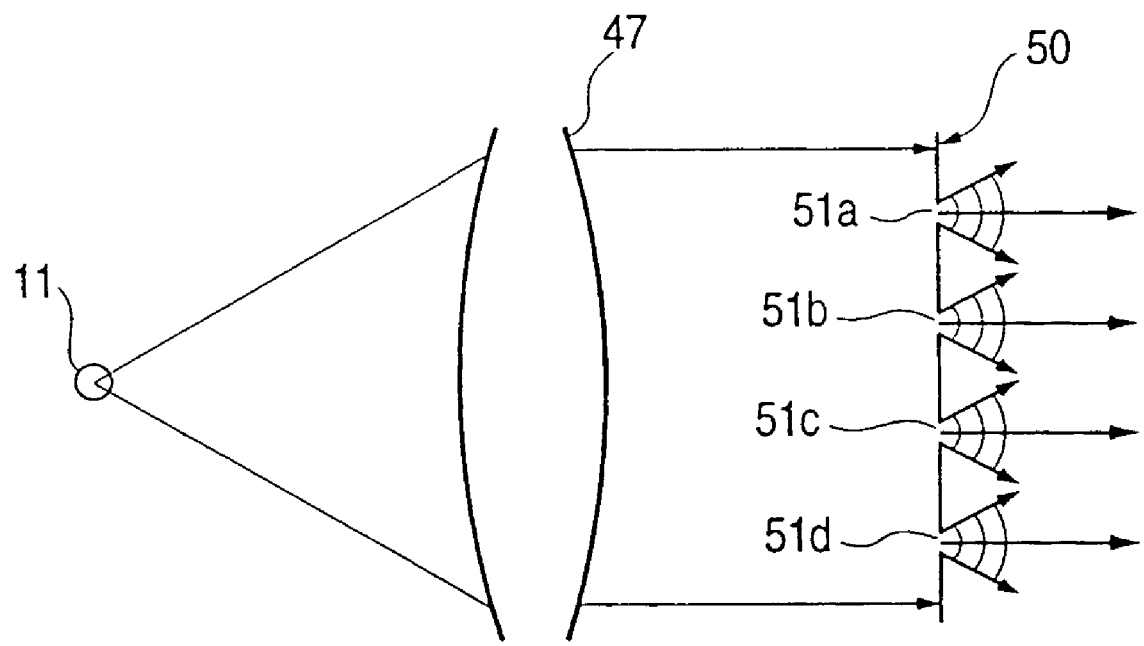
FIG. 5 is a diagram illustrating a method of forming a plurality of light sources having characteristics coincident with the real light source, by using a pin hole member in place of half-mirrors shown in FIG. 4.
Figure 7:
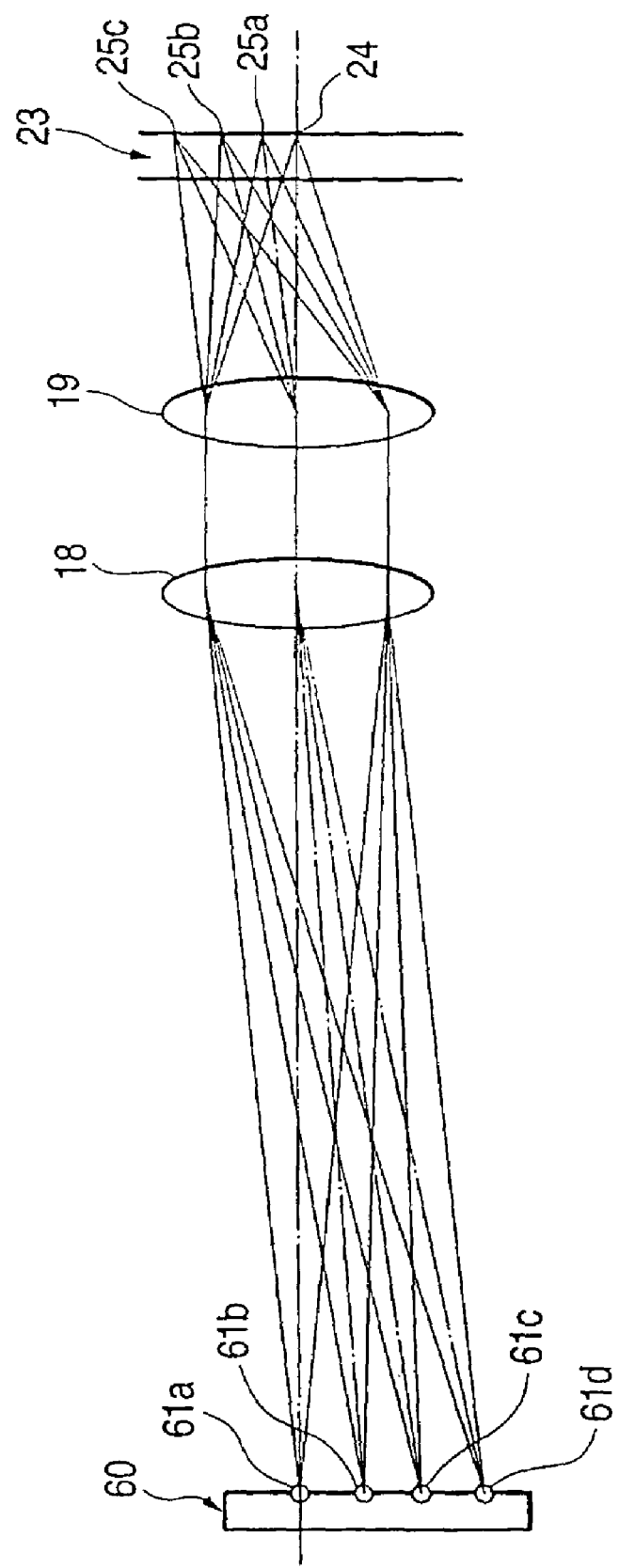
FIG. 7 is a diagram showing the configuration of a conventional optical pickup device which forms a plurality of light spots by using a semiconductor laser array.

FIG. 5 illustrates another method of forming a plurality of light sources having the characteristics coincident with those of the real laser light source, by using a pin hole member 50 in place of the half-mirrors 35a, 35b, and 35c shown in FIG. 4. Light emitted from the real laser light source 11 is transformed by a collimator lens 47 into parallel light fluxes which are applied to the pin hole member 50 and output from pin holes 51a, 51b, 51c, and 51d. Light output from each pin hole is equivalent to the light output from the imaginary laser light source. By using light output from each pin hole, a diffraction hologram pattern of the hologram module 13 is determined.

FIGS. 6A to 6C are graphs and a diagram illustrating a method of improving tracking servo light spots. Light transmitted through the non-diffraction hologram pattern 14 shown in FIG. 2 is used for reading data on a track of the optical disk as well as for tracking servo. A light spot 24 as a tracking servo light spot is required to have a uniform intensity over the whole area of the spot. However, as shown in FIG. 6A, the intensity distribution of light incident upon the non-diffraction hologram pattern 14 of the hologram module 13 from the real laser light source 11 has a mountain shape with an apex at its center. This intensity distribution can be improved by using a phase hologram pattern. Namely, the deeper the groove of a phase hologram pattern, the more the amount of non-diffraction light (0-th order light) can be reduced and the more the diffraction light amount can be increased by using the reduced amount of non-diffraction light as the diffraction light. Further, the more the width of a valley (groove) is made equal to the width of a hill (non-groove), the more the amount of 0-th order light can be reduced and the more the diffraction light amount can be increased by using the reduced amount as the diffraction light. As shown in FIG. 6B, the depth of the groove 54 is made smaller at the position remoter from the optical axis center to thereby reduce the amount of 0-th order light and direct the reduced amount of light toward different directions. Instead of adjusting the depths of grooves 54, the depths of grooves 54 may be made equal and the ratio of each non-groove width to a total width of each pair of adjacent groove 54 and non-groove is set as a1>a2>a3>a4>a5>a6, . . . , >an, where a1, a2, a3, a4, a5, a6, . . . , an are ratios at positions from a near position to the optical axis center to a far position therefrom in this order. In the above manners, as shown in FIG. 6C, the light intensity distribution can be made uniform in some range about the optical axis center in a radial direction. By using the diffraction hologram pattern 104 having grooves 54 such as shown in FIG. 6B, the intensity distribution of incident light can be made flat. If a tracking servo signal is generated from reflected light of a light spot formed by such uniform intensity light, this tracking servo signal is stable even if the objective lens is subject to a tracking shift.

The imaginary laser light sources 12a, 12b, and 12c of the optical pickup device 20 shown in FIGS. 1 and 2 are disposed on only one side of the real laser light source 11. Instead, they may be disposed on both sides of the real laser light source 11. In this case, the imaginary laser light sources 12a, 12b, and 12c are disposed on both sides of the real laser light source 11 generally in symmetry with the real laser light source 11. Further, although the non-diffraction and diffraction hologram patterns 14, 15a, 15b, and 15c of the optical pickup device 20 shown in FIGS. 1 and 2 are disposed on the hologram module 13 only on the side of the semiconductor laser 10, they may be disposed on the hologram module 13 only on the side of the collimator lens 18, or on both sides of the hologram module 13 (diffraction hologram pattern 15a on the semiconductor laser 10 side, diffraction hologram pattern 15b on the collimator lens 18 side, and so on). Furthermore, although the diffraction hologram patterns 15a, 15b, and 15c of the hologram module 13 of the optical pickup 20 shown in FIGS. 1 and 2 are disposed spaced apart in the column direction, they may be disposed partially overlapped in the column direction.

The optical pickup device of this invention has a hologram member which at least reduces aberration caused by optical elements in an optical path from the real laser light source to a recording medium. Accordingly, it is possible to form a plurality of light spots on a recording medium, the light spots having a light intensity and shape suitable for data read/write of the recording medium.

The optical pickup device of this invention has a hologram member which provides a uniform intensity of a light spot which otherwise lowers its intensity from the central area toward the peripheral area. Accordingly, it is possible to form a light spot on a recording medium, the light spot having a small change in the light intensity and being suitable for servo operations.

The invention claimed is:

1. An optical pickup device comprising:
a single real laser light source;
a hologram member for diffracting light emitted from said real laser light source to form at least two imaginary laser light sources; and
a light spot forming optical element for receiving light from said hologram member and forming a plurality of light spots on tracks of a recording medium,
wherein hologram patterns of said hologram member are determined so that diffraction light is given an inverse aberration of an aberration to be caused by optical elements in an optical path from said real laser light source to the recording medium, said aberration including a sub aberration caused upon diffraction in forming said imaginary laser light sources, wherein said aberration is canceled so as to reduce a diameter of each of said plurality of light spots.

2. An optical pickup device according to claim 1, wherein a light spot on the recording medium formed by non-diffraction light from said real laser light source is used for servo operations, and said hologram member has a hologram pattern which provides a uniform intensity of the servo light spot in a whole light spot area.

3. An optical pickup device according to claim 2, wherein hologram patterns in said hologram member are arranged along a direction of a longer axis of an elliptic light spot of said real laser light source.

4. An optical pickup device according to claim 2, wherein said hologram member is a phase hologram member, and the hologram pattern for diffraction corresponding to each imaginary laser light source is determined so that an intensity of diffraction light not used for light spot formation is reduced and a reduced amount of light is used as diffraction light for light spot formation.

* * * * *